(12) United States Patent
Goodinson

(10) Patent No.: US 8,243,076 B2
(45) Date of Patent: Aug. 14, 2012

(54) SYSTEM AND METHOD FOR COMIC CREATION AND EDITING

(76) Inventor: Clive Goodinson, Vancouver (CA)

( * ) Notice: Subject to any disclaimer, the term of this patent is extended or adjusted under 35 U.S.C. 154(b) by 887 days.

(21) Appl. No.: 12/291,113

(22) Filed: Nov. 5, 2008

(65) Prior Publication Data

US 2010/0110080 A1    May 6, 2010

(51) Int. Cl.
*G06T 11/00* (2006.01)
(52) U.S. Cl. ....................... 345/467; 345/173
(58) Field of Classification Search ............ 345/467, 345/173

See application file for complete search history.

(56) References Cited

U.S. PATENT DOCUMENTS

| | | | |
|---|---|---|---|
| 6,069,622 A | 5/2000 | Kurlander | |
| 6,232,966 B1 | 5/2001 | Kurlander | |
| 7,054,804 B2 | 5/2006 | Gonzales et al. | |
| 2006/0082597 A1 | 4/2006 | McDaniel | |
| 2008/0039163 A1 | 2/2008 | Eronen et al. | |

FOREIGN PATENT DOCUMENTS

| | | |
|---|---|---|
| EP | 1898646 A2 | 3/2008 |
| JP | 2008084348 A | 4/2008 |

OTHER PUBLICATIONS http://mashable.com/2008/03/06/bitstrips/—dated Mar. 6, 2008.
http://www.businessweek.com/the_thread/techbeat/archives/2008/03/_i_stopped_by_t.html, dated Mar. 2008.
http://www.wired.com/geekdad/2008/10/makebeliefscom/#ixzz12SPIT7fx.
http://www.wired.com/underwire/2008/03/sxsw-cartooning/#ixzz12SUvNts, dated Mar. 2008.
http://wayback.archive.org/web/20080601000000*/http://bitstrips.com—archived pages dated Nov. 2, 2008.
http://wayback.archive.org/web/20081001000000*/http://makebeliefscomix.com—archived pages dated Nov. 2, 2008.
http://wayback.archive.org/web/20080601000000*/http://stripcreator.com—archived pages dated Jul. 5, 2008.
http://wayback.archive.org/web/20080815000000*/http://stripgenerator.com—archived pages dated Oct. 7, 2008.
http://wayback.archive.org/web/20080915000000*/http://toondoo.com—archived pages dated Nov. 4, 2008.
http://www.howcast.com/videos/4074-Bitstrips-SXSW-Interview-By-Austincast com—video uploaded Apr. 22, 2008.
http://wayback.archive.org/web/20080715000000*/http://ff0000.com—archived pages dated Nov. 4, 2008.
http://wayback.archive.org/web/20080701000000*/http://www.wefail.com—archived pages dated Oct. 13, 2008.

*Primary Examiner* — Maurice L McDowell, Jr.
(74) *Attorney, Agent, or Firm* — Benoît & Côté

(57) ABSTRACT

A system and method for comic creation and editing utilizes pre-drawn comic objects arranged in comic panels. Comic panels include pre-drawn comic objects with articulatable parts which may be manipulated by a user of a networked user computer such as by use of a web browser. Comic panels created or edited by a user can be stored and retrieved from a central comic server. A system and method for translating text in comic panels is also provided. Additionally a system and method for linking comic objects in a comic panel to other web resources is disclosed.

6 Claims, 7 Drawing Sheets

SYSTEM AND METHOD FOR COMIC CREATION AND EDITING

1. TECHNICAL FIELD

The present invention relates generally to computer software and systems. More particularly, the present invention relates to a system and method for creation and editing of comic panels.

2. BACKGROUND OF THE INVENTION

Comics are a well-known graphic medium typically including one or more frames or images, typically called comic panels, which are presented in a sequence to define a sequential narrative. Comic panels typically include graphical representations of one or more characters, with a character's speech or thoughts represented as text shown in a word bubbles associated with the character who is speaking. A comic may comprise a single comic panel, but typically includes multiple comic panels representing a sequence of events or narration involving one or more characters. Collections of such sequences of related comic panels are typically referred to as comic strips or graphic novels, for example.

Conventionally, comics have been predominantly produced by hand-drawing methods, whereby a comic artist draws at least the preliminary graphics and text comprising a comic panel. Machine-assisted methods of producing comics are known in the art, such as for outlining or colouring comic sketches initially prepared by a human artist. The requirement for comics to be drawn predominantly by hand introduces limitations including the speed and quality with which comics can be produced, and the artistic talent which is required to produce comics, making it difficult for an unskilled or unartistic person to produce a comic strip.

With the arrival of computer-aided drawing and illustrating methods, some comics may be drawn using computer assisted methods such as computerized drawing and animation programs. However, in general, the use of such programs known in the art to produce comics still requires artistic skills in the comic artist in order to be able to produce comic drawings of desirable quality, which significantly limits the ability of an unskilled or unartistic person to produce a comic strip.

Accordingly, there is a need for a computer system and method for creating and editing comics that allows an unskilled or unartistic person to produce interesting and high quality comic strips, and preferably for many such users to be able to produce comics in an online distributed application, which does not require the installation of specialized or expensive computer drawing software, for example.

3. SUMMARY OF THE INVENTION

It is an object of the present invention to provide a system and method for creation and editing of comic panels that addresses some of the limitations of the prior art.

Another object of the present invention is to provide a system and method for online creation and editing of comic panels by a remote user over a computer network, for example, that addresses some of the limitations of the prior art.

It is a further object of the invention to provide a networked computer system and computer implemented method for creation and editing of comic panels comprising user manipulation of articulatable pre-drawn comic objects, for example, that addresses some of the limitations of the prior art, including the ability for unskilled and/or unartistic users to easily create and edit comic panels.

Yet a further object of the invention is to provide a networked computer system and computer implemented method for translating text in comic panels comprising pre-drawn comic objects, for example, that addresses some of the limitations of the prior art.

It is an additional object of the invention to provide a computer implemented method of linking pre-drawn comic objects in a comic panel with other resources, for example, that addresses some of the limitations of the prior art.

According to an embodiment of the invention, in a networked computer system having a user computer and a server computer, a method is provided, comprising receiving pre-drawn comic objects from the server computer and displaying the objects on a user computer, receiving a user selection of a selected pre-drawn comic object in a comic panel on the user computer, receiving a user input rotating an articulatable part of the selected pre-drawn comic object from a first position to a second position, displaying the second position of the articulatable part of the selected pre-drawn comic object in an updated comic panel on the user computer, transmitting the second position of the articulatable part of the selected pre-drawn comic object to the server computer, and storing the second position of the articulatable part of the selected pre-drawn comic object in the updated comic panel on the server computer.

According to another embodiment, in a networked computer system having a user computer and a server computer, a computer implemented method for translating text in a comic panel comprising at least one pre-drawn comic object is provided comprising: receiving speech bubble text entered by a user and displaying the speech bubble text in a comic panel on a user computer, generating a raster image of the comic panel on the user computer, transmitting the speech bubble text and the raster image from the user computer to the server computer, and storing the speech bubble text and raster image on the server computer.

According to a further embodiment of the invention, a computer implemented method for creating links in a comic panel is provided comprising: receiving a user-composed comic panel comprising multiple pre-drawn comic objects, calculating non-overlapping boundary coordinates for the pre-drawn comic objects in the comic panel, generating a raster image of the comic panel, transmitting the raster image and the boundary coordinates to a server computer, and storing the raster image and boundary coordinates on the server computer.

Further advantages of the invention will become apparent when considering the drawings in conjunction with the detailed description.

4. BRIEF DESCRIPTION OF THE DRAWINGS

The system and method of the present invention will now be described with reference to the accompanying drawing figures, in which.

Like reference numerals refer to corresponding parts throughout the several views of the drawings.

5. DETAILED DESCRIPTION OF THE INVENTION

Figure 1:
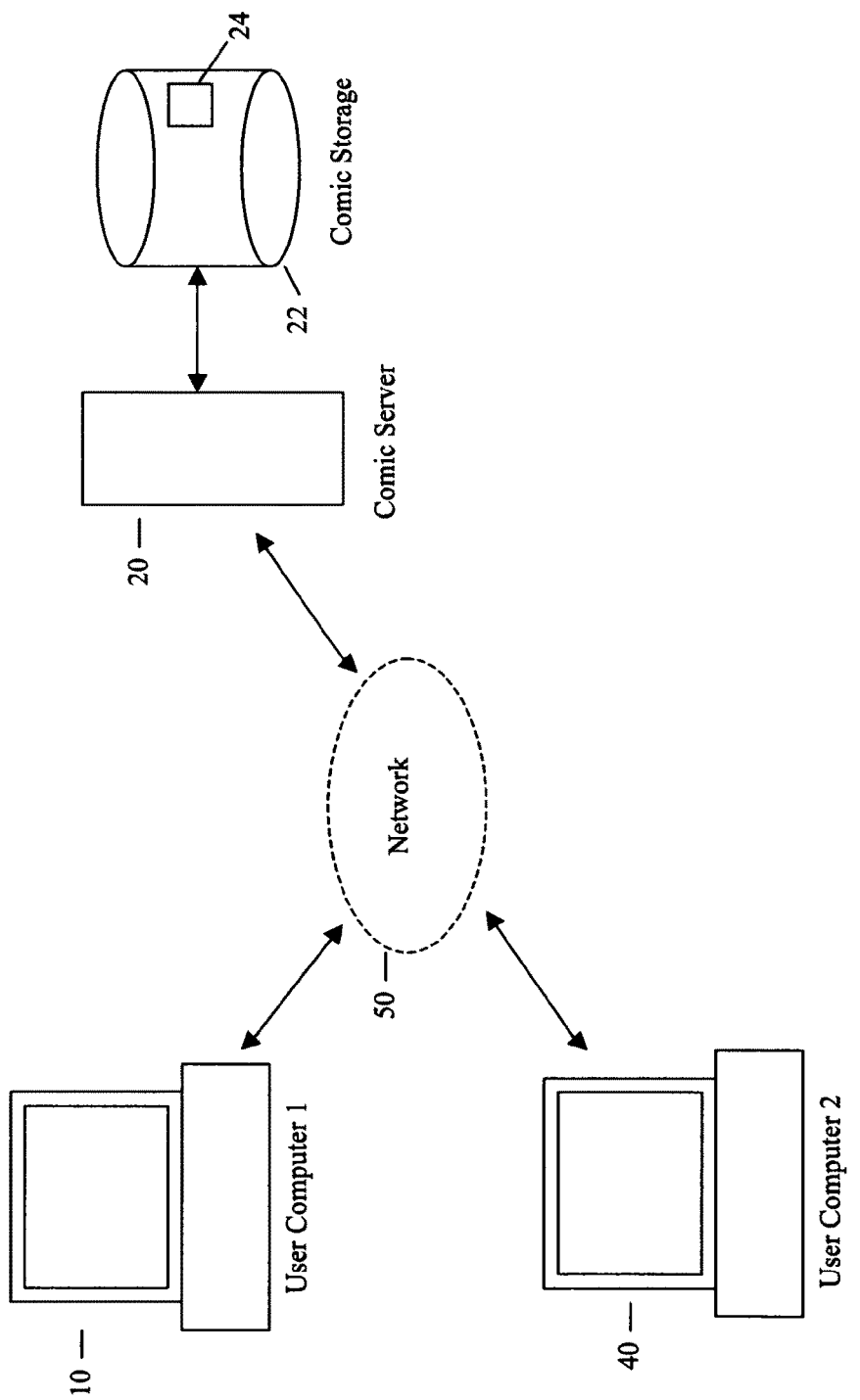
FIG. 1 illustrates an exemplary networked operating environment for implementing an embodiment of the present invention.

FIG. 1 illustrates an exemplary networked operating environment in which embodiments of the present invention may be implemented. The networked environment includes a first user computer 10 connected to a communication network 50, which may include one or more of a local area network, wide area network, world wide web (WWW), or the global Internet, for example, such that first user computer 10 may communicate with other computers similarly connected to network 50. Other computers connected to network 50 may include a comic server 20, and a second user computer 40, which may each communicate with any other computer connected to the network 50. User computer 10 includes standard computing components for transmitting and receiving data to and from other computers connected to the user computer 10 through network 50.

Comic server 20 includes standard computing components for providing a comic creation and editing program to one or more user computers over the network 50. The comic server 20 may typically provide a comic creation and editing software program to user computers for execution on the user computers, such as by serving web pages contain or host the comic creation and editing program to one or more user computers over the network 50. In particular, comic server 20 is connected to a comic storage repository 22 which stores one or more comic resources 24. Comic storage repository 22 may comprise a conventional data storage device such as a hard disk or solid-state memory located with and connected directly to comic server 20, or may comprise a remote data storage facility connected to comic server 20. Each comic resource 24 typically may comprise data for one or more viewable comic panels, each comic panel including one or more comic objects such as comic characters, backgrounds, prop objects, text bubbles, etc. A comic resource 24 may comprise a single comic panel, or may more commonly comprise multiple comic panels arranged in a typically narrative sequence to form one or more comic strip segments, which may be accessed by a user computer 10 connected to the comic server 20 through network 50. A comic resource 24 may also comprise one or more pre-drawn comic objects suitable for arranging by a user to create or edit a comic panel, such as pre-drawn comic characters, props, backgrounds, etc., or libraries of pre-drawn comic objects, such as a comic character library, for example.

Comic server 20 also store or access one or more executable software programs or collections of executable instructions, such as application scripts or commands for executing comic creation and editing operations on a user computer. The comic creation and editing executable instructions and/or program may also be comprised or embedded in a webpage served by comic server 20, for execution on a user computer 10, such as by a web browser running on the user computer 10, or an application plug-in within a web browser running on the user computer 10. The comic creation and editing executable instructions or program may be expressed in any suitable computer-readable languages such as those used in the Adobe Flash™, Adobe Flex™, or Microsoft Silverlight™ multimedia environments for example. In one embodiment, the comic creation and editing program may be expressed in a compiled ActionScript™, or .swf program file suitable for execution by the Adobe Flash Player™ application running in a web browser on a user computer, for example. In another embodiment, comic creation and editing executable instructions (or program) may be expressed in a JavaScript™ file, suitable for execution on a user computer, such as within a JavaScript-capable web browser application running on the user computer 10. The comic creation and editing executable instructions and/or program provided by comic server 20 for execution on a user computer 10 may also provides access to one or more comic resources 24 stored by comic server 20, and which may be accessed by user computer 10 through the comic creation and editing executable instructions and/or program executing in a web browser application on the user computer 10.

Similar to user computer 10, second user computer 40 also includes standard computing components for transmitting and receiving data to and from other computers connected to the second user computer 40 through network 50. The comic server 20 is preferably operable to provide the comic creation and editing executable instructions and/or programs and access to comic resources 24 to multiple user computers 10, 20 simultaneously.

Figure 2:
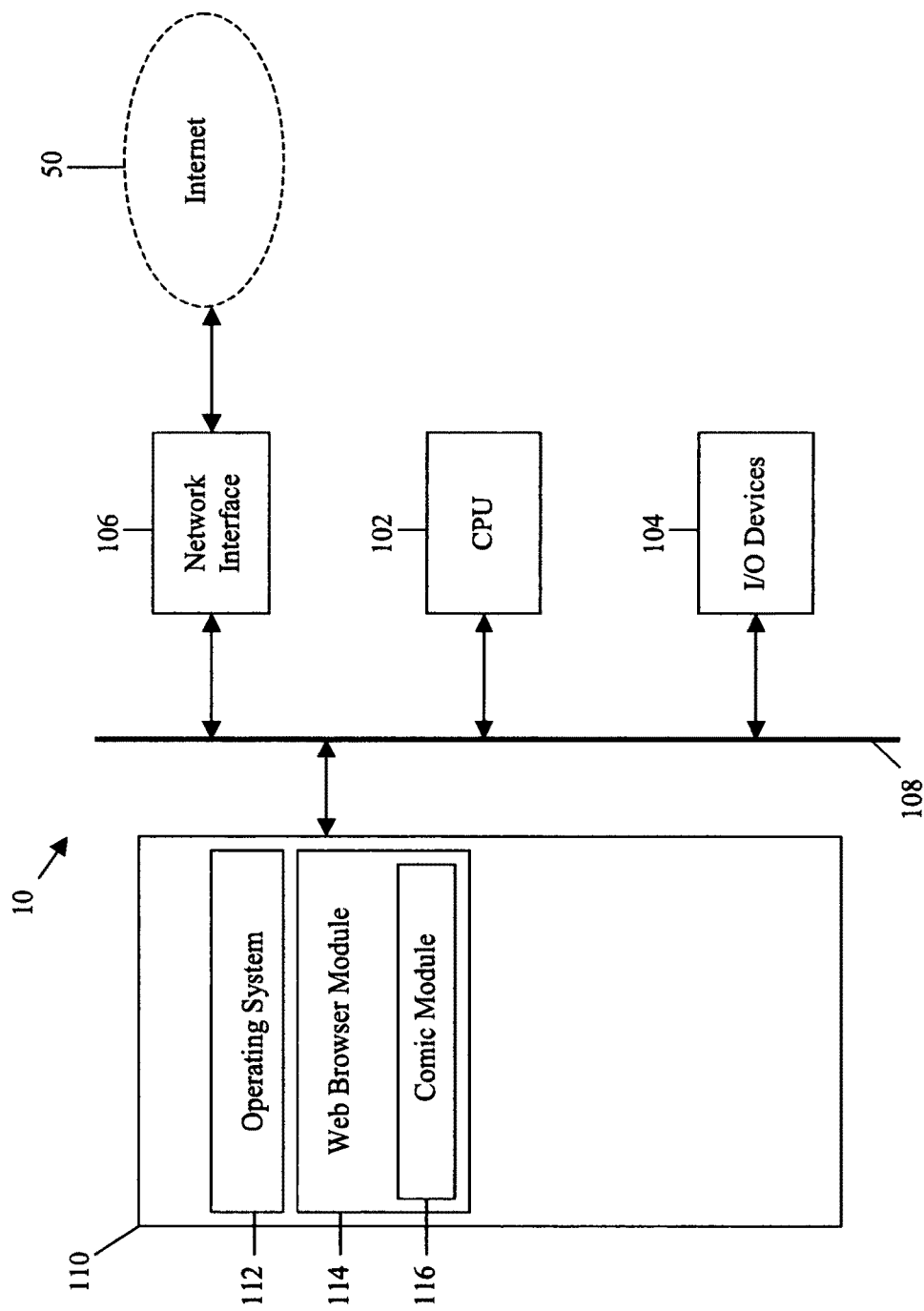
FIG. 2 illustrates an exemplary user computer architecture configured according to an embodiment of the invention.

FIG. 2 illustrates an exemplary computer architecture for a user computer 10 configured in accordance with an embodiment of the invention. According to an embodiment of the invention, the exemplary second user computer 40 as described above, may also be configured similarly to the exemplary architecture of user computer 10 as illustrated in FIG. 2. The user computer 10 includes standard components, including a central processing unit 102 and input/output devices 104, which are linked by a bus 108. The input/output devices 104 may comprise one or more of: a keyboard, mouse, touch screen, monitor, scanner, printer, and the like, for example. A network interface 106 is also connected to the bus 108. The network interface 106 provides connectivity to a network 50, such as the exemplary network 50 described above, thereby allowing the user computer 100 to operate in a networked environment. Also connected to the bus 108 is a computer-readable memory 110. The memory 110 stores executable instructions to implement functions of the invention. The computer-readable memory 110 may comprise any available computer-readable media or device that can be accessed by the computer 100.

In an embodiment of the invention, one or more of the following program modules and data files may be stored in the memory 110 of the computer 10: an operating system module 112, a Web browser module 114 and a comic module 116.

The operating system module 112 may be suitable for controlling the operation of a networked user computer, and in particular may comprise executable instructions for handling various system services, such as file access services, or for performing hardware dependant tasks. Operating system module 112 may also comprise instructions for standard computer operation, including receiving input from input devices such as a keyboard, mouse or touchscreen, and for displaying output in a graphical format on a monitor or display screen, for example.

The web browser module 114 comprises executable instructions for browsing webpages provided by a web server or other source, such as instructions for requesting and receiving a webpage from a web server and displaying the webpage on a display device such as a monitor. Web browser module 114 also comprises instructions for receiving input from a user's interaction with a webpage such as from input devices like a keyboard and mouse for example, and for transmitting such user input to a web server. Web browser module 114 also comprises instructions for executing processing commands comprised in webpages such as HTML/XML commands for example, or commands comprised in other files such as program files, or script files.

The comic module 116 comprises executable instructions for creating and editing comic panels which are suitable for execution by a web browser, such as instructions for creating a comic panel from pre-drawn comic objects selected and manipulated by a user, and allowing one or more users to view and edit a previously created comic panel, for example. In a preferred embodiment of the invention, the executable instructions for creating and editing comic panels comprised in the comic module 116 are provided to the user computer 10 by the comic server computer 20, such as in a comic creation and editing program or script file which is stored on the comic server 20 and provided to the user computer 10 over network 50, such as by including or embedding the program or script file in a webpage received by the user computer 10 which may be executed in the web browser module 114 on user computer 10, for example. In one embodiment, comic module 116 also comprises executable instructions for accessing and/or storing one or more stored comic resources 24 from comic server 20, such as over network 50, for example. In a further embodiment, comic module 116 comprises executable instructions for entering and translating text in comic panels, and for creating linked areas in a comic panel. Such exemplary instructions associated with comic module 116 are described in further detail below with reference to FIGS. 4-6.

The above described program modules 112, 114 and 116 incorporate instructions to implement processing operations associated with the invention. Various embodiments of the processing operations of the above-described program modules are described below with reference to FIGS. 4-6. The modules stored in memory 110 are exemplary, and additional modules can be included. It should be appreciated that the functions of the presented program modules may be combined. In addition, a function of a module need not be performed on a single machine, instead, the function may be distributed across a network to one or more other computers if desired, for example. It is the functions of the invention that are significant, not where they are performed or the specific manner in which they are performed.

Figure 3:
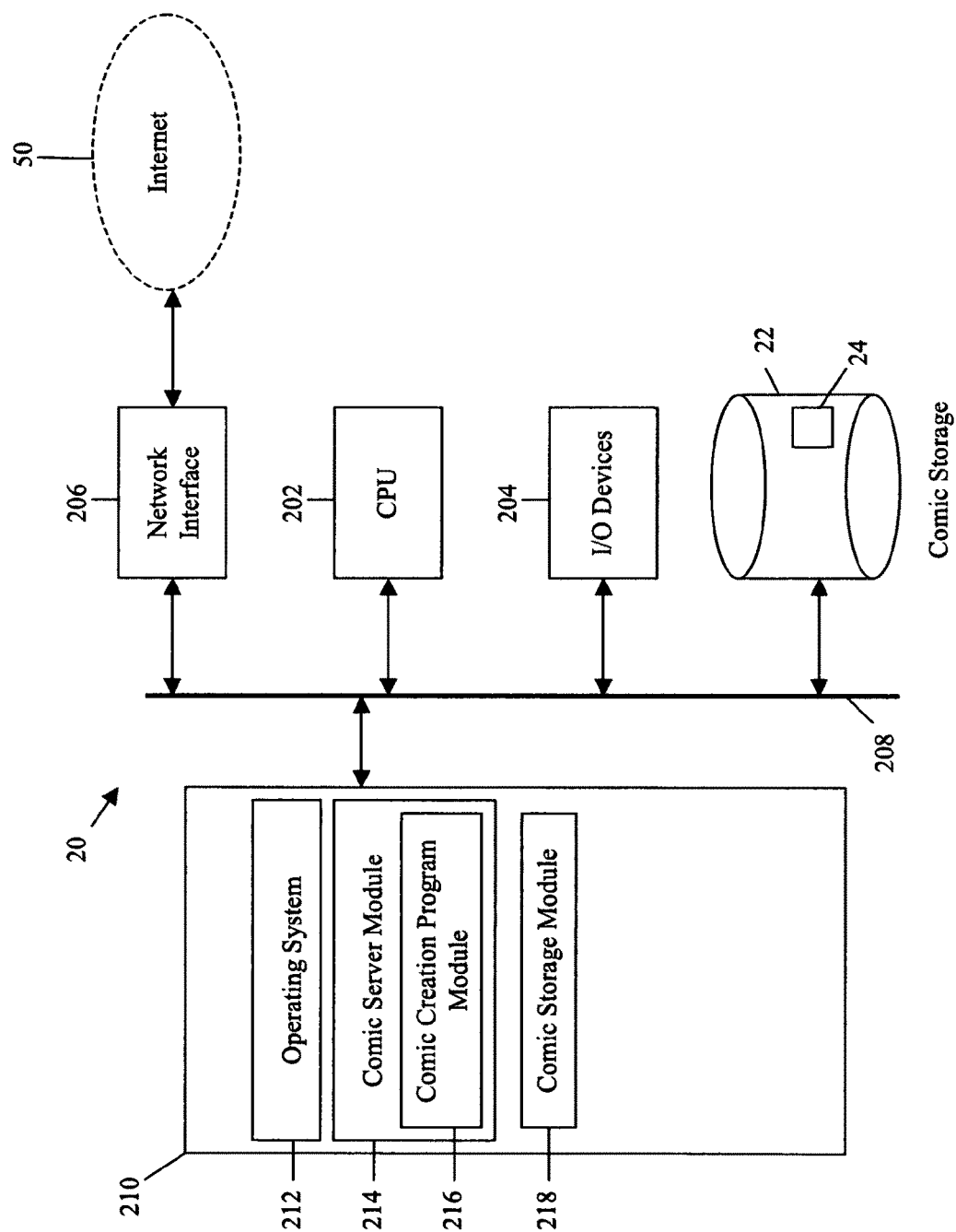
FIG. 3 illustrates an exemplary comic server computer architecture configured according to an embodiment of the invention.

FIG. 3 illustrates an exemplary computer architecture for a comic server computer 20, such as illustrated in the computer system of FIG. 1, configured in accordance with an embodiment of the invention. The comic server computer 20 includes standard components, including a central processing unit 202 and input/output devices 204, which are linked by a bus 208. The input/output devices 204 may comprise a keyboard, mouse, touch screen, monitor, printer, and the like, for example. A network interface 206 is also connected to the bus 208. The network interface 206 provides connectivity to a network 50, such as the exemplary network 50 described above, thereby allowing the comic server computer 20 to operate in a networked environment. Comic server 20 also comprises a comic storage repository 22 capable of storing one or more comic resources 24. Comic storage repository 22 may comprise a conventional data storage device such as a hard disk or solid-state memory located with and connected directly to comic server 20 such as by bus 208 as shown in FIG. 3, or may alternately comprise a remote data storage facility accessibly connected to comic server 20. In an alternative embodiment, comic storage repository 22 may comprise multiple remote storage facilities, such as redundant storage facilities, or the multiple virtualized storage facilities implied in "cloud computing" networked storage/hosting facilities, for example. Also connected to the bus 208 is a computer-readable memory 210. The memory 210 stores executable instructions to implement functions of the invention. The computer-readable memory 210 may comprise any available computer-readable media or device that can be accessed by the comic server computer 20.

In an embodiment of the invention, one or more of the following program modules and data files may be stored in the memory 210 of the web server computer 20: an operating system module 212, a comic server module 214, a comic creation and editing program module 216 and a comic storage module 218.

Similar to module 112 described above, the operating system module 212 may comprise instructions for handling various system services for comic server computer 20, such as file services or for performing hardware dependant tasks. Operating system module 212 may also comprise instructions for standard computer operation, including receiving input from input devices such as a keyboard or mouse, and for displaying output on an output device, such as in a graphical format on a monitor, for example.

The comic server module 214 comprises executable instructions for serving comic resources (which may be contained in one or more webpages according to one embodiment) requested by a user computer, such as instructions for receiving a request for a comic resource from a user computer, accessing the comic resource, and serving a webpage containing the comic resource to the requesting user computer, for example. Comic server module 214 may also comprise executable instructions for receiving input from a user's interaction with a comic resource or associate webpage (such as a user's creation or editing of a comic panel), processing such user input, and storing and/or serving additional content to a user computer in response. In a preferred embodiment, executable instructions comprised in comic server module 214 may be expressed in a suitable script language, such as PHP, for example, suitable for execution by comic server 20.

In one embodiment, the comic creation program module 216 may be stored as a sub-module of web server module 214, and comprises at least one program file or script file that contains executable instructions for performing comic creation and editing processing operations executable by a user computer 10. The comic creation program module 216 may also comprise further executable instructions for retrieving the comic creation and editing program or script file and providing it to a user computer as a .swf program file or Javascript file, for example. In one embodiment, the comic creation and editing program or script file may be provided to the user computer within a webpage transmitted to the user computer, to be executed on the user computer in the user's web browser application running on the user computer. In another embodiment, the comic creation and editing program or script file may be stored in comic storage repository 22 and comic creation program module 216 also comprises instructions for accessing comic storage repository 22 to retrieve the comic creation and editing program or script file.

Comic storage module 218 comprises instructions for accessing comic storage repository 22, such as for accessing and retrieving stored comic resources 24, in response to requests for such comic resources from a user computer, for example, or for storing comic resources and/or data received from a user computer. In a preferred embodiment, the instructions comprised in comic storage module 218 may be expressed in any suitable language, such as mySQL for example, suitable for execution by the comic server 20 to access and retrieve stored comic resources 24 to and from the comic storage repository 22. In one embodiment, the comic storage repository 22 may be structured as a database, such as a mySQL database, for example.

Figure 4:
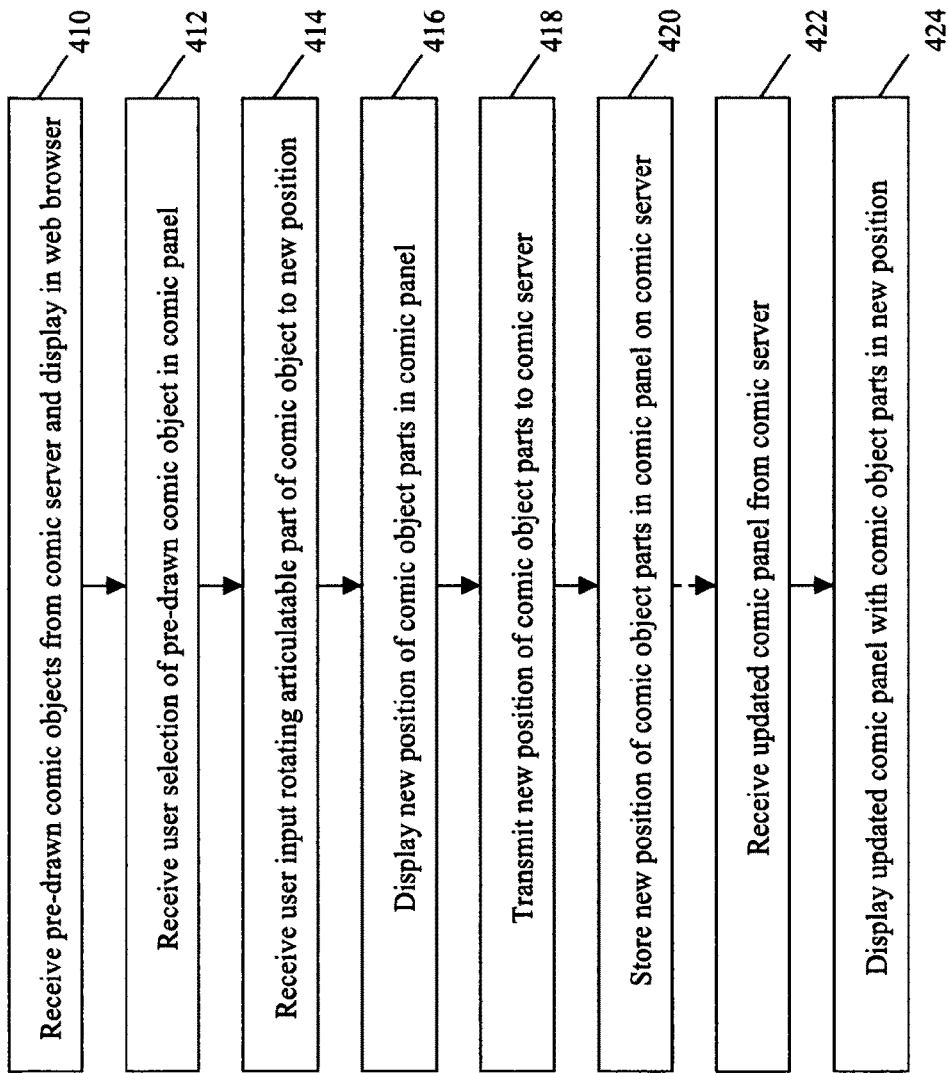
FIG. 4 illustrates a series of processing operations associated with creating a comic panel according to an embodiment of the invention.

FIG. 4 illustrates a series of processing operations that may be implemented by the system illustrated in FIG. 1, and the exemplary computers illustrated in FIGS. 2-3, according to an embodiment of the invention. In the first processing operation 410 of FIG. 4, a user computer 10 receives predrawn comic objects from a comic server 20 which are displayed in a web browser on the user computer 10. The predrawn comic objects comprise comic characters or props with one or more articulatable parts, each articulated part which may be rotated around at least one predefined axis to modify or articulate the predrawn comic object and thereby change the position, pose or appearance of the predrawn comic object. In an exemplary embodiment, the predrawn comic objects may comprise comic characters (typically human characters, but may also include animal or other non-human characters) which may have one or more articulatable limbs, such as upper and lower arms, upper and lower legs, hands, feet, for example, where the axis of rotation for the articulatable parts corresponds to joints in the comic character's body. In another exemplary embodiment, the predrawn comic objects may comprise props which have one or more articulatable parts, such as a car with one or more articulatable doors, for example, where the axis of rotation for the articulatable car door corresponds to the door hinge. In one embodiment, the predrawn comic objects are received by a user computer 10 from the comic server 20 using a web browser application running on the user computer 10, such as web browser module 114 on user computer 10. In another embodiment, the predrawn comic objects are received by a user computer 10 using a plug-in application, such as Adobe Flash Player™, in a user's web browser, which is executing a comic creation and editing program, such as comic module 116 on user computer 10. The predrawn comic objects may also typically be received by the user computer 10 from the comic server 20 in response to a request initiated by a user, such as a request to create a comic panel made by the comic creation and editing program executing on the user's web browser application, for example. The predrawn comic objects with articulatable parts may be received from storage in a comic storage repository 22 on the comic server 20, where they may be stored in a library of similar comic objects, such as a comic character library, or a comic prop library, for example.

In the second processing operation 412 of FIG. 4, the user computer 10 receives a user selection of a predrawn comic object in a comic panel. Processing operation 412 may be implemented using comic module 116 in user web browser module 114 on user computer 10. In a first embodiment where a user is creating a new comic panel, the user may select from a plurality of predrawn comic objects with articulatable parts which are displayed to the user within an exemplary comic panel by the comic creation and editing program in comic module 116 on the web browser on user computer 10, for example. In one option according to said first embodiment, a user may view various groupings of predrawn comic objects to ease their choice in selecting a comic object with articulatable parts to use in creating their desired comic panel. A user may choose to view predrawn comic characters of a particular gender or age, for example, and may then make a selection of their desired predrawn comic character such as by using a mouse, keyboard or other input device on user computer 10. In a second embodiment where a user is editing or otherwise modifying an existing comic panel, the user may select from the one or more predrawn comic objects with articulatable parts present in the existing comic panel, or may select a new predrawn comic object with articulatable parts from other available options such as a comic object library provided by comic server 20, for example.

In the next processing operation 414 of FIG. 4, the user computer 10 receives a user input rotating an articulatable part of a selected predrawn comic object to a new position. Processing operation 414 may be implemented using comic module 116 on user computer 10, for example. In one embodiment, a user may rotate an articulated part of the selected predrawn comic object by clicking on the articulated part of the comic object as displayed in the comic panel on the user computer 10 with a mouse or other pointing device and dragging the mouse to rotate the articulated part around its axis of rotation to a desired new position. In a second embodiment, a user may rotate an articulated part of the selected predrawn comic object by clicking on the articulated part of the comic object to select the part, and then repeatedly pressing, or pressing and holding a key or button on a keyboard or other input device to incrementally rotate the articulated part around its axis of rotation to a desired new position.

In the next processing operation 416 of FIG. 4, the user computer 10 displays the new position of the comic object parts in the comic panel. Processing operation 416 may be implemented using comic module 116 on user computer 10, for example. When an articulatable part of a comic object is rotated in the comic panel as disclosed in operation 414 above, the rotated articulatable part may have one or more dependent parts attached to the part that is rotated by the user. A dependent part is a part of the comic object that is attached directly or indirectly to the rotated part at the end opposite the axis of rotation of the rotated part. Accordingly, a dependent part is moved when an articulated part on which it depends is rotated. For example, in the case of a comic character with articulatable parts representing the upper arm, lower arm and hand of the character, if the upper arm is rotated by a user, the lower arm and hand are dependent parts attached to the upper arm, and are also moved by such rotation. In displaying the new position of the comic object parts in the comic panel in operation 416, the new position of all predrawn comic object parts that are affected by the rotated part are displayed in the comic panel, along with the unaffected comic object parts. In a first embodiment dependent comic object parts affected by the rotation of the rotated part may be displayed in the comic panel as translated from their original position according to the movement of the rotated part, but without rotating the dependent parts relative to the other comic objects in the comic panel. In such a case, the angle between the rotated part and dependent parts changes with the rotation. In a second embodiment, dependent comic object parts affected by the rotated part are displayed translated and rotated from their original position so as to preserve the original angle between the rotated part and dependent parts.

In the next processing operation 418 of FIG. 4, the user computer 10 transmits the new position of comic object parts to the comic server 20. Processing operation 418 may be implemented using comic module 116 on user computer 10, for example to transmit data describing the new position of comic object parts to comic server 20 via the user's web browser, over network 50. In a preferred embodiment, data transmitted to the comic server 20 describing the new position of comic object parts comprises the relative rotational positions of all comic object parts in the comic panel, as well as data defining the position of comic objects relative to the boundaries of the comic panel, and data defining the scaling and other attributes that describe the appearance of comic objects in the comic panel. In one embodiment, operation 418 also comprises the generation of a raster image of the comic panel which may also be transmitted to the comic server 20. In another optional embodiment, data describing the new position of comic object parts, and other data describing comic objects in the comic panel as described above are encoded by any suitable known encoding means prior to being transmitted to the comic server 20, such as to simplify and/or optimize data transmission and/or storage, for example. In a particularly preferred embodiment, processing operation 418 may be executed in response to a user input directing to save the active comic panel in the comic creation and editing program executing on the user computer 10, such as by the user selecting a "save" button or the like, or by the user closing the comic panel or series of panels, or opening a different comic panel or series of panels in the comic creation and editing program running on user computer 10, for example.

In the next processing operation 420 of FIG. 4, the comic server 20 stores the new position of comic object parts in the comic panel on the comic server 20. Processing operation 420 may be implemented using comic server module 214 on comic server 20, optionally in conjunction with comic storage module 218, for example. In a preferred embodiment, comic server 20 receives the new position of comic object parts from user computer 10 over network 50, including data defining the position and orientation of all comic objects in the comic panel which may also optionally be received in an encoded form, and stores the comic panel data including the new position of comic object parts in comic storage repository 22 as a comic resource 24. Optionally, the comic panel data received from user computer 10 may be stored in conjunction with data defining other sequentially related comic panels to form a comic resource 24 defining a series of comic panels, such as a comic strip for example.

In the next processing operation 422 of FIG. 4, the user computer 10 receives the updated comic panel from the comic server 20. Processing operation 420 may be implemented using comic module 116 on user computer 10, for example, to receive the updated comic panel which is stored on comic server 20 over network 50. In a preferred embodiment, operation 422 may be executed in response to a user input selecting the updated comic panel that has been previously stored by comic server 20, and such user input may occur at a substantially different time following the creation and storing of the updated comic panel according to operations 410, 412, 414, 416, 418 and 420. One such user input may comprise the user's selection of the updated comic panel in a new instance of the comic creation and editing program executing in a new webpage on the user's web browser, for example. A further exemplary such user input may comprise a second user selecting the updated comic panel for viewing or editing in the comic creation and editing program executing in the second user's web browser, for example.

In an alternative embodiment, operation 422 may represent an optional step which may optionally be executed following storing the updated comic panel on the comic server 20 according to operation 420, only if a user input selecting the updated comic panel is made on the user computer 10. In such alternative embodiment, if a user does not select the updated comic panel, the comic creation and editing operations illustrated in FIG. 4 may end with operation 420.

In the last processing operation 424 of FIG. 4, the user computer 10 displays the updated comic panel with comic object parts in the new position. Processing operation 424 may be implemented using comic module 116 on user computer 10, for example. In a preferred embodiment, the comic creation and editing program executing on user computer 10 renders the updated comic panel from updated comic panel data received from comic server 20, and displays the updated comic panel on the user computer 10. In one embodiment wherein the updated comic panel data received from the server computer 20 is in an encoded form, the comic creation and editing program executing on user computer 10 may also decode the updated comic panel data before rendering and displaying the updated comic panel. In an alternative embodiment, the comic panel data received from the comic server 20 in operation 422 may comprise the raster image of the update comic panel, and in operation 424 the user computer 10 may display the raster image of the updated comic panel in response to a user input selecting to view the updated comic panel. In a further alternative embodiment, the comic server 20 may be operable to render the updated comic panel, such that the user computer 10 displays the pre-rendered updated comic panel in operation 424.

Figure 5:
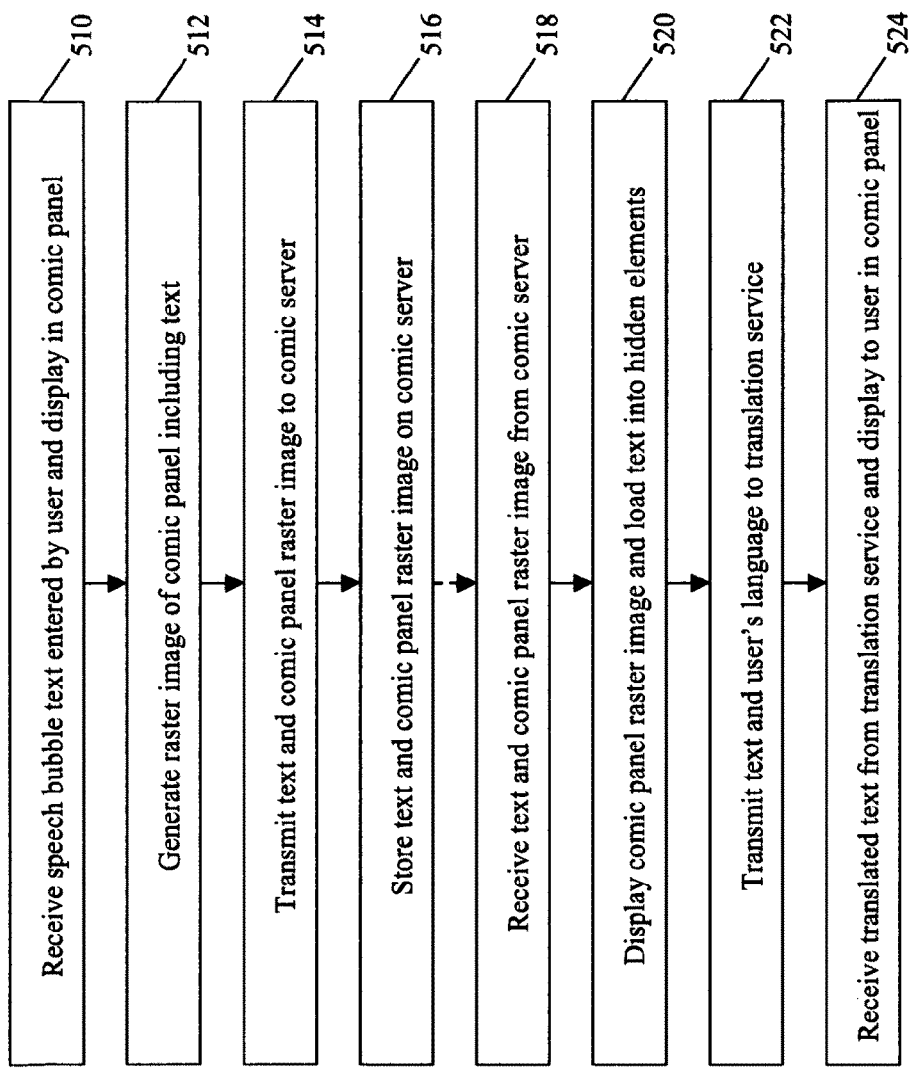
FIG. 5 illustrates a series of processing operations associated with translation of text in a comic panel according to an embodiment of the invention.

FIG. 5 illustrates a series of processing operations that may be implemented by the system illustrated in FIG. 1, and the exemplary computers illustrated in FIGS. 2-3, according to an embodiment of the invention directed to translation of text in comic panels. In the first processing operation 510 of FIG. 5, a user computer 10 receives speech bubble text entered by a user, and displays it in a comic panel. Processing operation 510 may be implemented using comic module 116 running on user web browser module 114 on user computer 10, for example. In a preferred embodiment, a user may enter speech bubble text using a keyboard or other input device of user computer 10, into a selected speech bubble displayed in a comic panel shown on user computer 10, such as a comic panel displayed by comic module 116 running in browser module 214. The selected speech bubble may preferably be associated with a comic character in the comic panel, and may represent the speech or thoughts of the associated comic character. In an alternative embodiment, the speech bubble text may comprise text associated with another display object in the comic panel, rather than a comic character, such as a sign or heading displayed in the comic panel, for example.

In the second processing operation 512 of FIG. 5, the user computer 10 generates a raster image of the comic panel including text. Processing operation 512 may be implemented using comic module 116 running in web browser module 114 on user computer 10, for example. The raster image of the comic panel including the entered text in the speech bubble associated with a comic character in a comic panel, or entered text associated with another display object in a comic panel, may be generated using any suitable known technique.

In the next processing operation 514 of FIG. 5, the user computer 10 transmits the text and comic panel raster image to the comic server 20. Processing operation 514 may be implemented using comic module 116 on user computer 10, for example to transmit the text, and comic panel raster image including the text to comic server 20 via the user's web browser, over network 50. According to one embodiment, at least a portion of the text and/or comic panel raster image may be encoded by the user computer before transmission to the comic server 20, such as to compress or secure the transmitted data, for example.

In the next processing operation 516 of FIG. 5, the comic server 20 stores the text and comic panel raster image on the comic server 20. Processing operation 516 may be implemented using comic server module 214 on comic server 20, optionally in conjunction with comic storage module 218, for storing the data, for example. In a preferred embodiment, the comic panel raster image received by the comic server 20 from the user computer 10 includes all comic objects including speech bubbles or other display objects in the comic panel, and stores the text and comic panel raster image in comic storage repository 22 as a comic resource 24. Optionally, the text, and comic panel raster image received from user computer 10 may be stored in conjunction with data defining other sequentially related comic panels to form a comic resource 24 defining a series of comic panels, such as a comic strip for example. According to a further preferred embodiment of the invention, the processing operations illustrated in FIG. 5 may be advantageously performed in conjunction with the comic creation operations of FIG. 4, and in particular, transmit and store operations 514 and 516 may advantageously be performed substantially concurrently with analogous transmit and store operations 418 and 420 of FIG. 4, respectively, for example.

In the next processing operation 518 of FIG. 5, the user computer 10 receives the text and comic panel raster image from the comic server 20. Processing operation 518 may be implemented using comic module 116 on user computer 10, for example, to receive the text and comic panel raster image which are stored on comic server 20 over network 50. In a preferred embodiment, operation 518 may be executed in response to a user input selecting the comic panel that has been previously stored by comic server 20 for viewing on the user computer 10, and such user input may occur at a substantially different time following the entry of speech bubble text and storing of the text and comic panel image according to operations 510, 512, 514, and 516. One such user input may comprise the user's selection of the comic panel in a new instance of the comic creation and editing program executing in a new webpage on the user's web browser, for example. A further exemplary such user input may comprise a second user selecting the comic panel for viewing in the comic creation and editing program executing in the second user's web browser, for example.

In an alternative embodiment, operation 518 may represent an optional step which may optionally be executed following storing the text and comic panel on the comic server 20 according to operation 516, only if a user input selecting the comic panel is made on the user computer 10. In such alternative embodiment, if a user does not select the updated comic panel, the comic text translation operations illustrated in FIG. 5 may end with operation 516.

In the next processing operation 520 of FIG. 5, the user computer 10 displays the comic panel raster image and loads the text into hidden elements. Processing operation 520 may be implemented using comic module 116 on user computer 10, for example, where the comic panel raster image is displayed in a webpage running on the web browser module 114 on the user computer, and where the text is loaded into hidden HTML elements on the webpage. Alternatively, the text may be loaded into hidden JavaScript or other elements on the webpage that are not viewable by the user. In one embodiment where the comic panel raster image and/or text data received from the comic server 20 is in an encoded form, the user computer 10 may also decode the received data before displaying the comic panel image loading the text into the hidden elements. According to one embodiment of the invention, as described above, the processing operations illustrated in FIG. 5 may be advantageously performed in conjunction with the comic creation operations of FIG. 4, and in particular, receiving and displaying operations 518 and 520 may advantageously be performed substantially concurrently with analogous receive and display operations 422 and 424 of FIG. 4, respectively, for example.

In an alternative embodiment of the invention, a raster image of the comic panel may not be generated as described in operation 512 above, but rather data describing the position and appearance of all comic objects in the comic panel may be transmitted and stored on the comic server 20, and then wholly or partly reconstructed by the user computer 10 from comic panel data received from the comic server 20, and the speech bubble text may be directly displayed in the corresponding speech bubble or other display object in the comic panel as displayed on the user computer 10.

In the next processing operation 522 of FIG. 5, the user computer 10 transmits the text, and the user's language to a translation service. Processing operation 522 may be implemented using comic module 116 on user computer 10, for example, to transmit the speech bubble text and user's language (which may be entered by a user, or may be retrieved from a user account record stored on the comic server 20 or user computer 10, for example) to a translation service via the user's web browser, over network 50. In a preferred embodiment, the translation service may be a commercially available machine translation service that provides for automated translation of text between multiple languages, for example. In an alternative embodiment, comic server 20 may transmit the text and user language to the translation service in place of the user computer 10. In a further alternative embodiment, the translation service may be located on the user computer 10, such as a translation program running on the user computer.

In the last processing operation 524 of FIG. 5, the user computer 10 receives translated text from the translation service, and displays it to the user in the comic panel. Processing operation 524 may be implemented using comic module 116 on user computer 10, for example. In a preferred embodiment, the translated text received from the translation service in the user's language is displayed in a visible HTML or other visible element on the comic panel image, which is displayed on the user's computer. Typically, the translated text may be displayed as subtitles located near the bottom of or below the comic panel, although alternatively the translated text may be displayed at any other desired location such as overlaid on or around the comic panel, for example.

Figure 6:
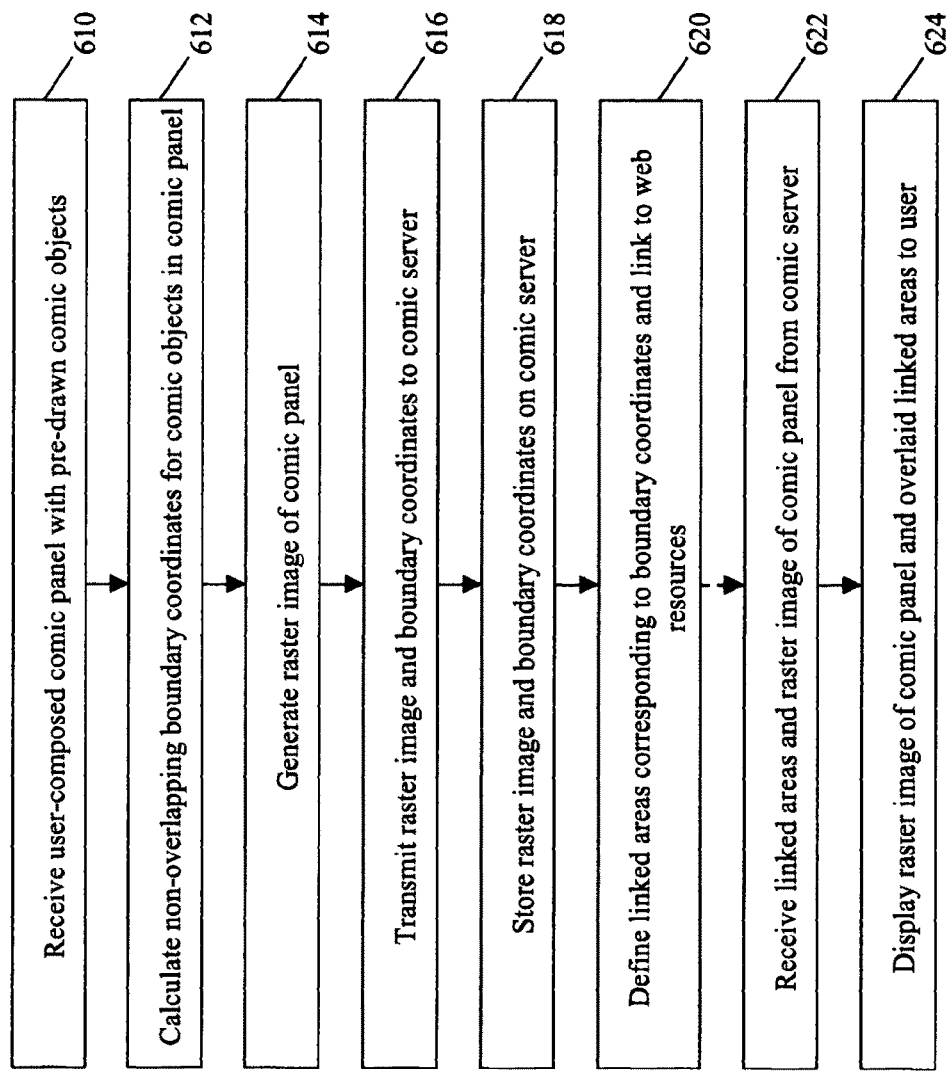
FIG. 6 illustrates a series of processing operations associated with creating links to objects in a comic panel according to an embodiment of the invention.

FIG. 6 illustrates a series of processing operations that may be implemented by the system illustrated in FIG. 1, and the exemplary computers illustrated in FIGS. 2-3, according to an embodiment of the invention directed to linking comic panels. In the first processing operation 610 of FIG. 6, a user computer 10 receives a user-composed comic panel with pre-drawn comic objects. Processing operation 610 may be implemented using comic module 116 running on user web browser module 114 on user computer 10, for example. In a preferred embodiment, the user-composed comic panel may be received from the comic server 20, or may have been composed by the user on user computer 10 such as by use of a comic creation and editing program running on the user computer, as described above in reference to FIG. 4, for example. In a particularly preferred embodiment, the user-composed comic panel, may comprise pre-drawn comic objects with articulatable parts, such as comic characters, for example.

In the second processing operation 612 of FIG. 6, the user computer 10 calculates non-overlapping boundary coordinates for the comic objects in the comic panel. Processing operation 612 may be implemented using comic module 116 running in web browser module 114 on user computer 10, for example. The non-overlapping boundary coordinates may be calculated by the user computer using a defined algorithm, such as a suitable graphical analysis algorithm or method, for example.

In the next processing operation 614 of FIG. 6, the user computer 10 generates a raster image of the comic panel. Processing operation 614 may be implemented using comic module 116 running in web browser module 114 on user computer 10, for example. The raster image of the comic panel may be generated using any suitable known technique.

In the next processing operation 616 of FIG. 6, the user computer 10 transmits the raster image and boundary coordinates to the comic server 20. Processing operation 616 may be implemented using comic module 116 on user computer 10, for example to transmit the comic panel raster image and boundary coordinates to comic server 20 via the user's web browser, over network 50. According to one embodiment, at least a portion of the boundary coordinates and/or comic panel raster image may be encoded by the user computer before transmission to the comic server 20, such as to compress or secure the transmitted data, for example.

In the next processing operation 618 of FIG. 6, the comic server 20 stores the raster image and boundary coordinates on the comic server 20. Processing operation 618 may be implemented using comic server module 214 on comic server 20, optionally in conjunction with comic storage module 218, for storing the data, for example. In a preferred embodiment, the comic panel raster image received by the comic server 20 from the user computer 10 includes all comic objects in the comic panel, and stores comic panel raster image and boundary coordinates in comic storage repository 22 as a comic resource 24. Optionally, the comic panel raster image and boundary coordinates received from user computer 10 may be stored in conjunction with data defining other sequentially related comic panels to form a comic resource 24 defining a series of comic panels, such as a comic strip for example. According to a further preferred embodiment of the invention, the processing operations illustrated in FIG. 6 may be advantageously performed in conjunction with the comic creation operations of FIG. 4, and in particular, transmit and store operations 616 and 618 may advantageously be performed substantially concurrently with analogous transmit and store operations 418 and 420 of FIG. 4, respectively, for example.

In the next processing operation 620 of FIG. 6, the comic server 20 defines linked areas corresponding to the boundary coordinates and links the linked areas to web resources. Processing operation 620 may be implemented using comic server module 214 on comic server 20, for example, to define non-overlapping linked areas defined by the boundaries of the comic objects in the comic panel, and to link each linked area to a web resource, such as another webpage or other resource that is accessible from a user's web browser. In an exemplary embodiment, the linked area corresponding to a comic character may be linked to a web resource connected to that character, such as a webpage or another comic panel featuring that comic character. Similarly, a linked area corresponding to a comic prop object may be linked to a web resource such as a webpage that describes or sells that type of object, for example.

In the next processing operation 622 of FIG. 6, the user computer 10 receives the linked areas raster image of the comic panel from the comic server 20. Processing operation 620 may be implemented using comic module 116 on user computer 10, for example, to receive the linked areas and raster image of the comic panel which are stored on comic server 20, over network 50. In a preferred embodiment, operation 622 may be executed in response to a user input selecting the comic panel that has been previously stored by comic server 20 for viewing on the user computer 10, and such user input may occur at a substantially different time following the calculation of boundary coordinates and storing of the coordinates and comic panel image according to operations 610, 612, 614, 616, 618 and 620. One such user input may comprise the user's selection of the comic panel in a new instance of the comic creation and editing program executing in a new webpage on the user's web browser, for example. A further exemplary such user input may comprise a second user selecting the comic panel for viewing in the comic creation and editing program executing in the second user's web browser, for example.

In an alternative embodiment, operation 622 may represent an optional step which may optionally be executed following defining linked areas corresponding to the boundary coordinates on the comic server 20 according to operation 620, only if a user input selecting the comic panel is made on the user computer 10. In such alternative embodiment, if a user does not select the updated comic panel, the comic linking operations illustrated in FIG. 6 may end with operation 620.

In one embodiment where the linked areas and comic panel raster image data received from the comic server 20 is in an encoded form, the user computer 10 may also decode the received data before displaying the comic panel image. According to one embodiment of the invention, as described above, the processing operations illustrated in FIG. 6 may be advantageously performed in conjunction with the comic creation operations of FIG. 4, and in particular, receiving and displaying operations 622 and 624 may advantageously be performed substantially concurrently with analogous receive and display operations 422 and 424 of FIG. 4, respectively, for example.

In the last processing operation 624 of FIG. 6, the user computer 10 displays the raster image of the comic panel and overlaid linked areas to the user. Processing operation 624 may be implemented using comic module 116 on user computer 10, for example. In a preferred embodiment, the linked areas are overlaid over the comic panel such that each linked area is aligned with the comic object in the comic panel to which it corresponds, and that the linked areas are not visible to a user, such as by overlaying the linked areas in a hidden HTML or other element on a webpage displayed by the user's web browser. Additionally in the preferred embodiment when a user clicks on a linked area in the web browser, the web resource associated with the linked area may be accessed and displayed.

Figure 7:
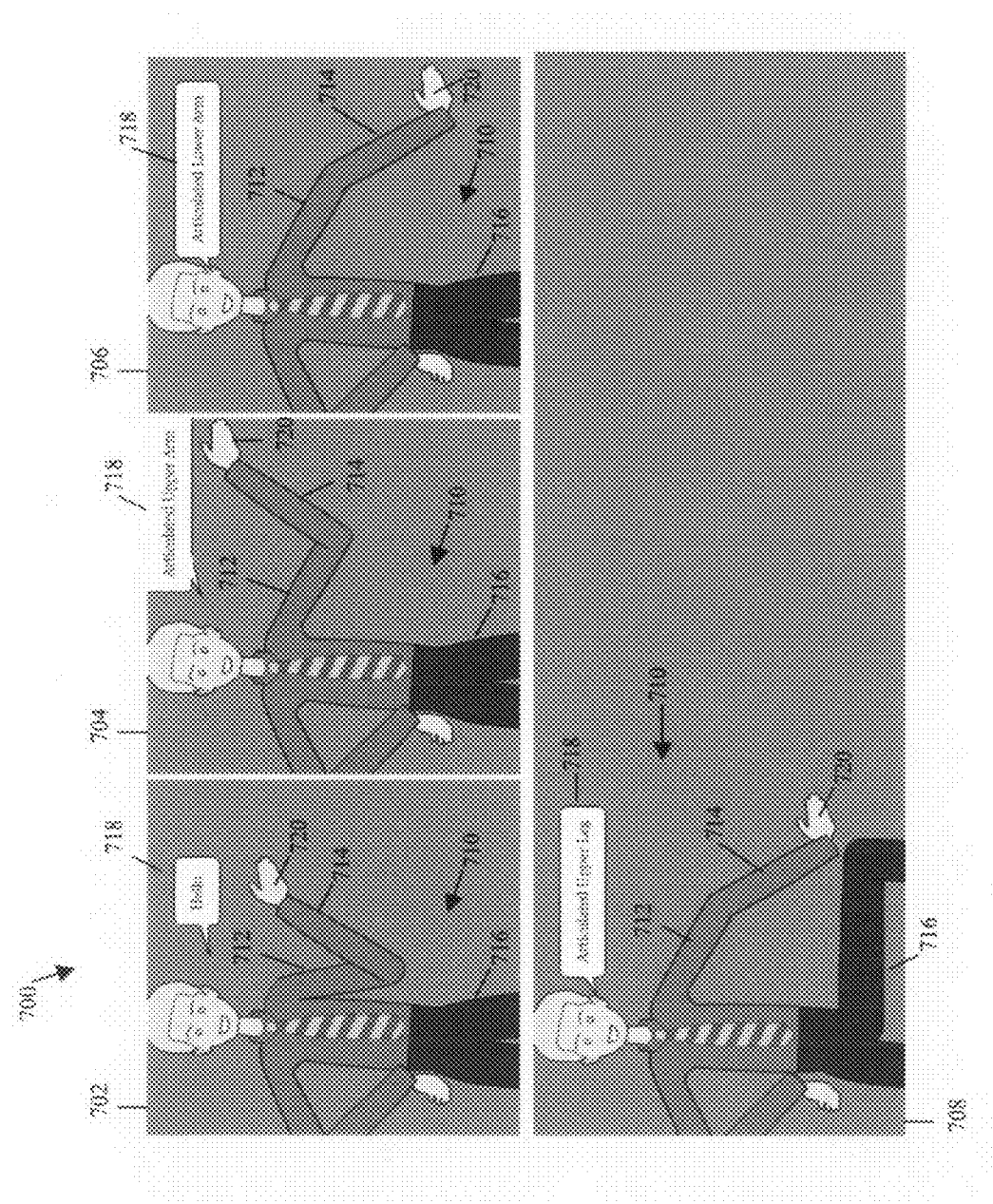
FIG. 7 illustrates a series of comic panels that show articulation of a comic object according to an embodiment of the invention.

FIG. 7 illustrates a series of exemplary sequential comic panels or comic strip 700 showing the articulation of a comic object, namely comic character 710. In the first comic panel 702 of the comic strip 700, the comic character 710 is shown in a starting position, with a corresponding speech balloon 718 including the text "Hello", associated with the character 710. The comic character 710 comprises articulatable parts, including upper arm 712, lower arm 714, hand 720 and upper leg 716 parts, for example, which are all attached to the torso of the character 710. The upper arm 712 and upper leg 716 parts are directly attached to the torso of the character 710 by their axes of rotation which are located at the shoulder and hip, respectively, of the character 710. However, the lower arm 714 and hand 720 are articulatably attached to upper arm 712 by an axis of rotation at the elbow, so that the orientation of the lower arm 714 is dependent on the orientation of the upper arm 712, and the orientation of the hand 720 is dependent on the orientation of the lower arm 714.

In the second comic panel 704 of the comic strip 700, the upper arm 712 of the comic character 710 has been rotated, such as by a user implementing the processing operations described above in reference to FIG. 4, so that the upper arm 712 is now held away from the torso of the character 710, and the text of the speech balloon 718 has been appropriately changed to "Articulated Upper Arm". Accordingly, the dependent lower arm 714 and hand 720 have been translated from their original positions in comic panel 702 due to the rotation of the upper arm 712. However, the angle of the lower arm 714 and hand 720 relative to other objects in the comic panel 704 remains constant, despite the rotation of the upper arm 712. In an alternative embodiment, the angle of the dependent lower arm 714 and hand 720 relative to the upper arm 712 may be instead kept constant during rotation of the upper arm 712. The position of the upper leg 716 is unchanged in the second comic panel 704.

In the third comic panel 706, the lower arm 714 of the character 710 has been rotated downwards as shown, and the text of speech balloon 718 has been appropriately changed to "Articulated Lower Arm". Accordingly, the dependent hand 720 has been translated to its new position, but remains at the same angle relative to other comic objects in the comic panel 706. Similarly, in the fourth comic panel 708, the upper leg 716 has been rotated to a new position and the speech balloon 718 text changed to "Articulated Upper Leg", while the other parts remain unchanged.

In an additional embodiment of the invention, a method for drawing of joints or connections between pre-drawn articulatable parts of comic objects is provided, wherein the method may be implemented by the comic module 116 running on a user computer 10. In a first operation of the method, two adjacent comic object parts connected by an articulatable joint are positioned or rendered in the comic panel, such as by loading data defining the positions of the comic object parts received from comic server 20, for example, or in response to a user rotating the articulatable parts as described in reference to FIG. 4. The second operation comprises determining if a gap exists between the edges of the adjacent comic object parts, and if so, to extrapolate the edges of the adjacent objects to a point of intersection. The next operation comprises determining if the angle within the intersecting edge lines is less than 90 degrees, and if so, using the point of intersection as a control point for drawing a bezier curve connecting the adjacent object parts. Conversely, if the angle within the intersecting edge lines is greater than 90 degrees, a line connecting the opposing corners of the adjacent parts is drawn, and a perpendicular line bisecting the connecting line and proportional to its length is drawn, and the endpoint of such bisecting line is used as a control point for drawing a bezier curve connecting the adjacent comic object parts. The final operation comprises filling the line between the bezier curve and the adjacent comic object parts to complete drawing of the joint between the adjacent parts as they are displayed in the comic panel. This method for drawing joints between pre-drawn articulatable parts of comic objects may be combined with any other methods according to the invention such as described above in reference to FIGS. 4-6, for example.

In a further embodiment according to the present invention, a comic panel or series of comic panels such as a comic strip comprising pre-drawn comic objects may be created by a first user such as by using the comic creation and editing program stored in comic module 116 running on a first user computer 10 and stored on comic server 20, may then be shared with one or more additional users. In a first such arrangement, the first user may allow other users to view their comic panel(s) but not allow other users to modify or edit the panel(s). In such case, a second user may view the comic panel(s) such as by receiving raster images of the comic panel(s) from comic server 20, for viewing on second user computer 40, for example. In a second arrangement, the first user may allow other users to view their panel(s), and to modify or edit their panel(s). In such case, a second user may view and modify the panel(s) such as by receiving a copy of the full data description of the first user's comic panel(s) including definitions of all pre-drawn and manipulable objects in the panel(s) from the comic server 20, for rendering in a comic creation and editing program running on second user computer 40, for example, which will allow the second user to modify and store their own modified versions of the comic panel(s) without changing or affecting the original first user's comic panel(s) which remain stored on the comic server 20. In a third arrangement, the first user may select either specific other users who are allowed to view or modify the panel(s), or may select only certain aspects of the comic panel(s) that may be modified by other users, or combinations thereof. Such features for sharing comic panels between multiple users of the comic creation and editing system of the present invention may be particularly applicable to social networking, educational, or team environments where other members of a network, class or team may be permitted to view or modify a first user's comic panel(s).

In another embodiment of the invention, a method of articulating pre-drawn comic objects for animation is provided. A first operation of the method comprises creating a comic panel and articulating parts of a pre-drawn comic character in the panel as described above in operations 410-420 of FIG. 4 to define each of two or more keyframes that comprise a pre-drawn comic character in a specific position or pose. A second operation comprises interpolating a range of movement of the parts of the comic character between adjacent keyframe positions of the parts, and may be implemented by the comic module 116 running on a user computer 10, for example. A third operation comprises displaying the movement of the comic character parts between defined keyframe positions in a continuous motion animation viewable by a user, and may also be implemented by comic module 116. A fourth operation comprises storing the defined keyframe comic panel(s) depicting the keyframe positions of the comic character on the comic server 20, and may also optionally comprise storing the continuous motion animation on the comic server, such as by storing a video recording of the animation, for example. In order to replay an animation created according to the above-described method, either the animation can be reconstructed between the stored keyframe comic panel(s) on a user computer 10, or the video of the animation can be replayed by a user computer 10. Additionally, once an animation motion has been defined by a sequence of keyframe comic panel(s) composed by articulating a first pre-drawn comic character, in a preferred embodiment, the defined animation motion may also be applied to other predrawn comic characters selected by a user.

In yet a further alternative embodiment of the invention, the system and method for comic creation and editing comprises additional features for a user to compose and manipulate a comic panel incorporating pre-drawn comic objects. Such additional features may all be performed using the comic module 116 running on user computer 10, such as within the user's web browser, and advantagously provide for composing and manipulating the comic within the bounds of the comic panel displayed on the user computer 10. Such additional functionality includes:

- insertion and deletion of pre-drawn comic objects including comic characters, props and speech bubbles to and from the comic panel, such as by a user clicking on a pre-drawn comic object to select it, and then selecting from the options to insert or delete the object from the comic panel;
- translation and reflection of pre-drawn comic objects in addition to rotation (articulation) as described above in reference to FIG. 4, where the translation of an object may be conducted by a user clicking and dragging the object within the comic panel, and reflection by a user selecting the object, and then selecting an option to reflect the object within the panel;
- Changing the appearance of a pre-drawn comic object, such as the color, design or position of a part of the pre-drawn comic object such as by a user selecting from pre-set options for a given pre-drawn comic object;
- rotation, scaling and panning of the comic panel, such as by a user selecting a point within the panel and clicking and dragging the panel to rotate, scale or pan the panel, for example;

where any of the above-described additional functions may be implemented in combination with the operations described in reference to FIGS. 4-6.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Adobe Flash™, Adobe Flex™, ActionScript™, HTML, XML, JavaScript, Java™, or other scripting, markup and/or programming languages and development tools.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a networked computer system having a user computer and a server computer, a method comprising:
   - receiving pre-drawn comic objects comprising one or more articulatable parts from the server computer and displaying said pre-drawn comic objects on said user computer;
   - receiving a user selection of a selected pre-drawn comic object in a comic panel on said user computer;
   - receiving a user input rotating an articulatable part of said selected pre-drawn comic object from a first position to a second position including selecting the articulatable part of the pre-drawn comic object with an input device and dragging it to a desired new position;
   - displaying said second position of said articulatable part of said selected pre-drawn comic object in an updated comic panel on said user computer;
   - transmitting said second position of said articulatable part of said selected pre-drawn comic object to said server computer; and
   - storing said second position of said articulatable part of said selected pre-drawn comic object in said updated comic panel on said server computer.

2. The method of claim 1, additionally comprising:
   - receiving said updated comic panel from said server computer on said user computer; and
   - displaying said updated comic panel comprising said second position of said articulatable part of said pre-drawn comic object on said user computer.

3. The method of claim 1, wherein the input device is one of mouse, keyboard and touch screen.

4. In a networked computer system having a user computer and a server computer, a computer implemented method for translating text in a comic panel comprising at least one pre-drawn comic object, said method comprising:
   - receiving speech bubble text entered by a user and displaying said speech bubble text in a comic panel on said user computer;
   - generating a raster image of said comic panel on said user computer;
   - transmitting said speech bubble text and said raster image from said user computer to said server computer;
   - storing said speech bubble text and said raster image on said server computer;
   - receiving said speech bubble text and said raster image on said user computer;
   - displaying said raster image on a webpage on said user computer;
   - loading said speech bubble text into hidden elements on said webpage;
   - transmitting said speech bubble text to a translation service; and
   - receiving translated speech bubble text from said translation service and display said speech bubble text in said comic panel on said user computer.

5. A computer implemented method for creating links in a comic panel, comprising:
   - receiving a user-composed comic panel comprising at least multiple pre-drawn comic object;
   - calculating non-overlapping boundary coordinates for said pre-drawn comic objects in said comic panel;
   - generating a raster image of said comic panel;
   - transmitting said raster image and said boundary coordinates to a server computer;
   - storing said raster image and said boundary coordinates on said server computer;
   - defining linked areas corresponding to said boundary coordinates;
   - linking said linked areas to corresponding web resources;
   - receiving said linked areas and said raster image of said comic panel on a user computer; and
   - displaying said raster image of said comic panel and overlaying said linked areas on said raster image on said user computer.

6. In a networked computer system having a user computer and a server computer, a method comprising:
- receiving pre-drawn comic objects comprising one or more articulatable parts from the server computer and displaying said pre-drawn comic objects on said user computer;
- receiving a user selection of an articulatable part of a pre-drawn comic object in a comic panel on said user computer;
- receiving a user input rotating the selected articulatable part from a first position to a second position including selecting the articulatable part of the pre-drawn comic object with an input device and dragging it to a desired new position;
- displaying said second position of said articulatable part of said selected pre-drawn comic object in an updated comic panel on said user computer;
- transmitting said second position of said articulatable part of said selected pre-drawn comic object to said server computer; and
- storing said second position of said articulatable part of said selected pre-drawn comic object in said updated comic panel on said server computer.

* * * * *